United States Patent

Requa

[15] 3,639,806

[45] Feb. 1, 1972

[54] DIGITALLY ADDRESSED ELECTROLUMINESCENT SOLID STATE DISPLAY DEVICE COMPRISING MODULATING PLATE FOR INTENSITY MODULATING A SCANNING LIGHT BEAM

[72] Inventor: Stanley C. Requa, Northridge, Calif.

[73] Assignee: Northrop Corporation, Beverly Hills, Calif.

[22] Filed: Nov. 28, 1969

[21] Appl. No.: 880,855

[52] U.S. Cl. ......................315/169, 250/213 R, 250/220 M, 250/227, 340/166 EL

[51] Int. Cl. ....................H01j 31/50, H05j 37/00, G02b 5/16

[58] Field of Search ...............250/213, 220 MX, 213 A, 227; 315/169; 340/166 EL

[56] References Cited

UNITED STATES PATENTS

| | | | |
|---|---|---|---|
| 3,070,701 | 12/1962 | Wasserman | 250/213 A |
| 3,358,185 | 12/1967 | Lally | 315/169 |
| 3,141,105 | 7/1964 | Courtney-Pratt | 250/227 X |

*Primary Examiner*—James W. Lawrence
*Assistant Examiner*—T. N. Grigsby
*Attorney*—Sokolski & Wohlegemuth and W. M. Graham

[57] ABSTRACT

A uniform screen of light is provided by a planar member. Sandwiched between this member and a display surface are a plurality of control plates for forming a scanning light beam in response to digital control signals. Each control plate has a layer of photoconductive material and a layer of electroluminescent material deposited thereon. Also deposited on each of the control plates are electrodes arranged in predetermined finger patterns. The electrodes are biased in response to digital control signals to cause the beam to pass through the control plates to a single portion of the display surface at a time.

10 Claims, 5 Drawing Figures

Figure 1:
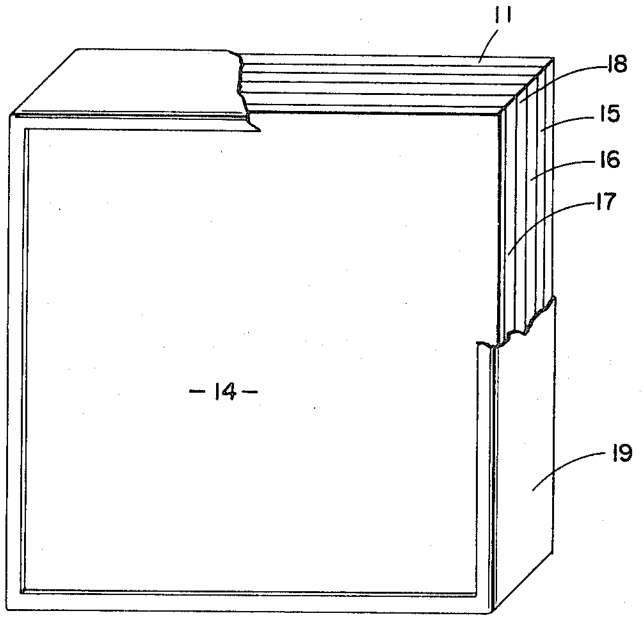

INVENTOR
STANLEY C. REQUA
BY
SOKOLSKI & WOHLGEMUTH
ATTORNEYS

INVENTOR

STANLEY C. REQUA

BY

SOKOLSKI & WOHLGEMUTH

ATTORNEYS

DIGITALLY ADDRESSED ELECTROLUMINESCENT SOLID STATE DISPLAY DEVICE COMPRISING MODULATING PLATE FOR INTENSITY MODULATING A SCANNING LIGHT BEAM

This invention relates to video display devices and more particularly to such a device utilizing a solid-state electroluminescent implementation.

Solid-state electroluminescent display devices which operate in response to digital control circuitry are particularly useful for such display applications as computer readouts, plotting and tracking equipment, large board displays, etc. Devices of this type have the advantage of lightweight flat construction. Further, this type of solid-state device does not require an evacuated envelope as do cathode-ray displays.

Most prior art solid-state electroluminescent displays have the disadvantage of the requirement of a large number of input electrodes and switching positions if high resolution is to be achieved in view of the fact that most of such devices are implemented by means of orthogonal grid members forming a matrix, with a separate switching control for each grid line. Thus, for example, in this type of prior art device, for a 64 element resolution display, 8 horizontal and 8 vertical switching elements are required, or for a resolution of 65,536 elements, 256 horizontal and 256 vertical switches are needed. In such prior art matrix devices, "crosstalk" is often experienced resulting in spurious outputs.

In my copending application, Ser. No. 735,835 now U.S. Pat. No. 3,479,646 a solid-state electroluminescent display device is described in which, by the utilization of a unique commutator and the combination of photoconductive and electroluminescent elements in both the display panel and the commutator, the number of switching elements as compared with prior art devices is drastically reduced. The device of this invention utilizes electroluminescent and photoconductive elements to generate the scanning beam. However, in the device of this invention, this end result is achieved in an entirely different manner by using finger pattern control members which control the light flux between a planar light source and a display surface rather than by using a photoelectric commutator for exciting portions of a matrix grid.

The device of this invention, as for the device described in my aforementioned application, also requires considerably less switching elements for controlling the beam than prior art electroluminescent displays. It thus more readily lends itself to miniaturization than matrix displays. Further, it has less tendency to "crosstalk" than this prior art device.

It is therefore the principal object of this invention to provide a solid-state electroluminescent display utilizing a controlled light beam capable of digital control, which requires a considerably lesser number of switching elements and which provide more accurate registration than prior art electroluminescent displays.

Figure 2:
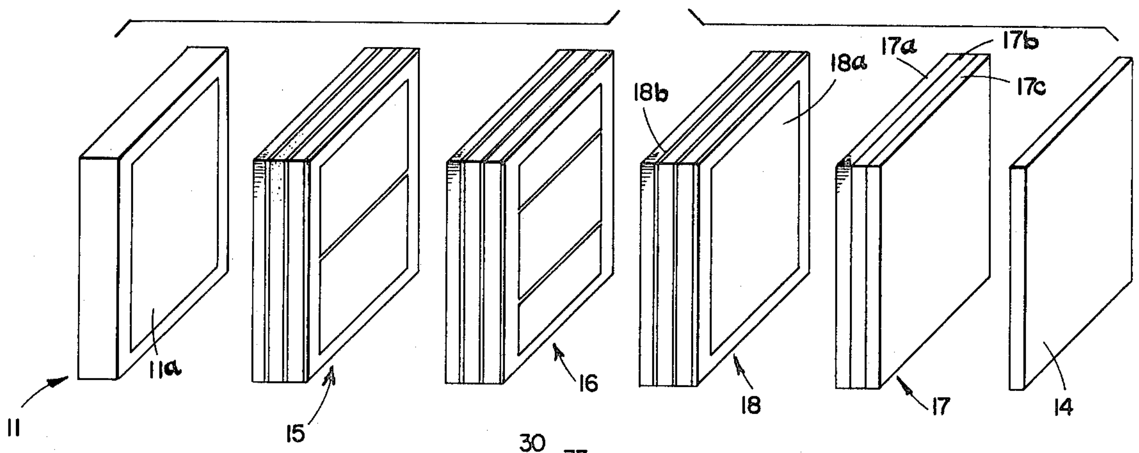
Figure 3:
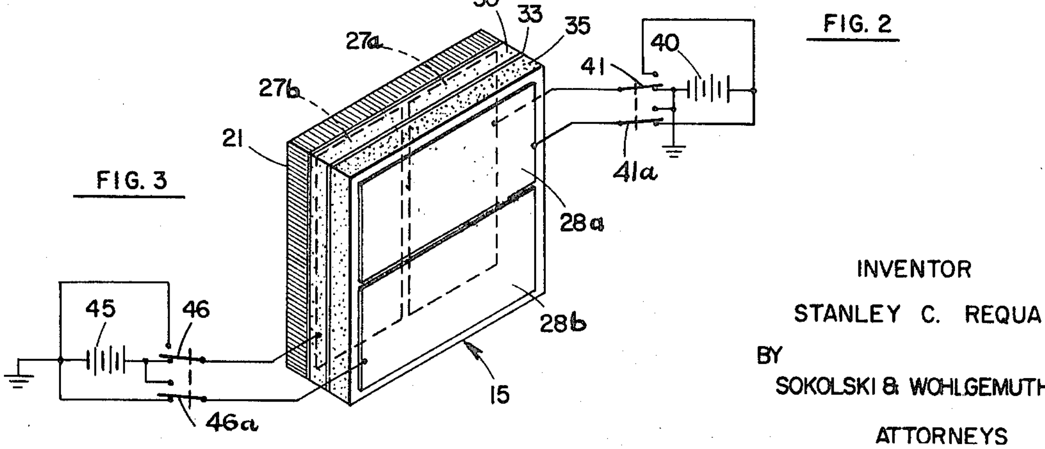
Figures 3A, 4:
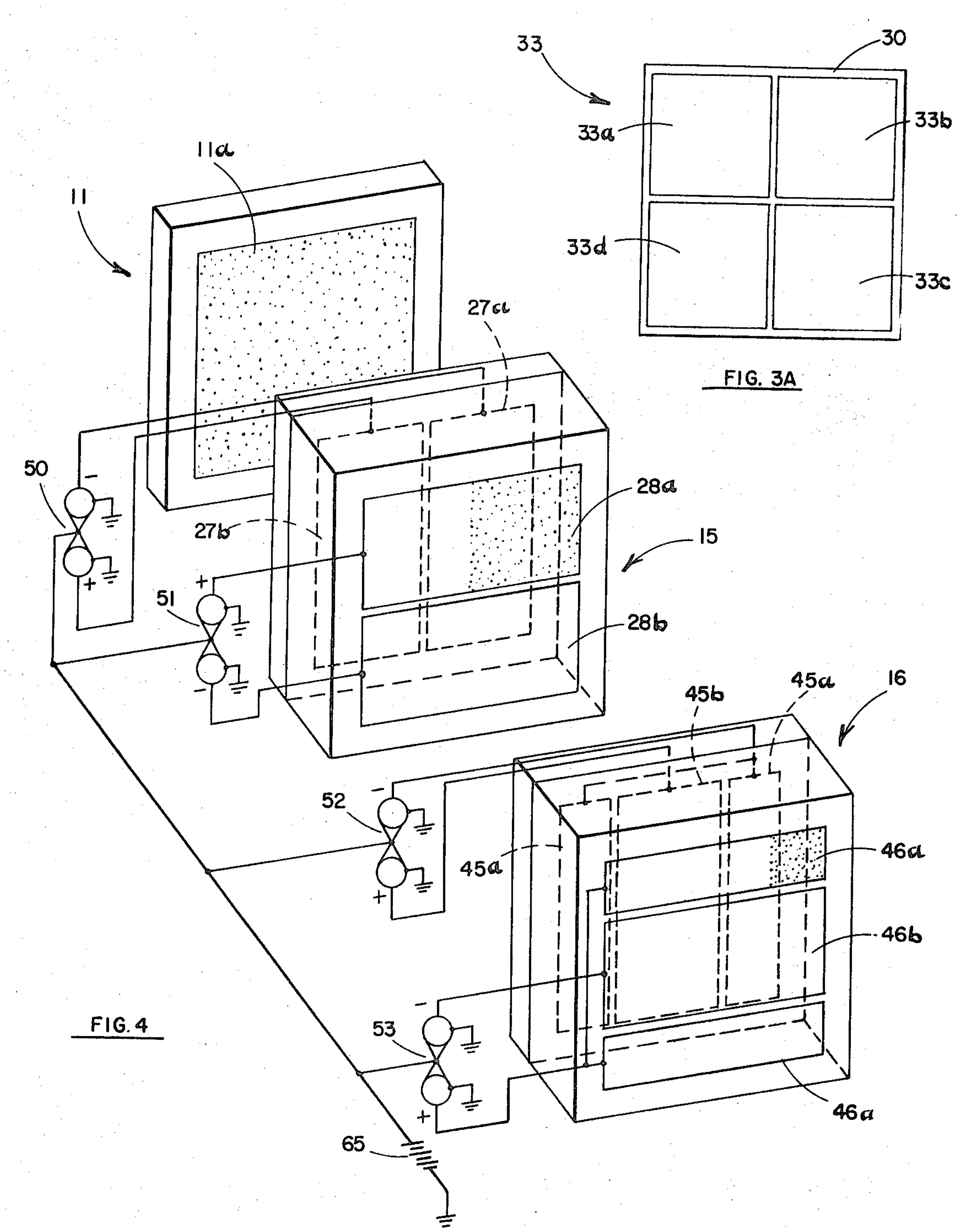

Other objects of this invention will become apparent as the description proceeds in connection with the accompanying drawings, of which:

FIG. 1 is a perspective view of a preferred embodiment of the device of the invention, FIG. 2 is an exploded view illustrating the basic elements of the preferred embodiment, FIG. 3 is a perspective view illustrating one of the control plates of the preferred embodiment, FIG. *3a* is a plan view of an interconnecting electrode of the control plate of FIG. 3, and FIG. 4 is a perspective view illustrating the operation of the control plates in directing the light beam between the cathode and the display plate.

Briefly described, the device of the invention comprises a planar member which acts as a uniform light source over a surface area corresponding to the display surface. A display surface, which may be in the form of a transparent faceplate, is aligned opposite the planar member, and sandwiched between these two members are a plurality of control plates. Each control plate comprises a substrate which is an optical coupling medium and on the surface of which are successively deposited a photoconductive material and an electroluminescent material. Also deposited on each plate is at least one set of transparent electrodes which are arranged in a predetermined finger pattern. Switching means are provided to alternatively forward bias one or the other of the electrodes of each set, the area over which the forward biased electrodes extend thus being provided with an electron accelerating potential for causing an electron flow to excite the oppositely positioned portions of the electroluminescent layer. Thus, by selectively switching the electrodes, a light beam can be directed to a single-elemental portion of the display surface at a time to provide a desired scanning thereof.

Referring now to FIGS. 1–3, the elements of the preferred embodiment of the device of the invention are illustrated. Light emitting planar member 11 has a coating **11*a* thereon which provides a uniform planar light source. Surface 11*a* may for example comprise an electroluminescent material. Aligned opposite planar member 11 is a display plate 14 which may be of a suitable transparent material, such as glass. Sandwiched between member 11 and display plate 14 and aligned therewith are control plate members 15 and 16, modulating "-grid" plate 18, and light multiplier plate 17. The members are held together in their proper alignment in a suitable casing 19 to form a relatively flat package as illustrated in FIG. 1**.

Referring now particularly to FIG. 3, each control plate comprises a substrate 21 which is an optical coupling medium to avoid transverse optical crosstalk, such as a fiber optic plate. Fiber optic plates are commercially available and comprise a plurality of glass capillaries which act as light channels. Deposited on substrate 21 are transparent electrodes **27*a* and 27*b*, which may be of tin oxide, and are applied to the substrate by a technique such as reactive sputtering. Deposited over electrodes 27*a* and 27*b* is a layer 30 of photoconductive material which may comprise doped silicon or cadmium sulfide or cadmium selenide with appropriate activators, such as cadmium chloride and copper or silver. This layer may be deposited by vacuum deposition techniques well known in the art. Deposited over photoconductive layer 30 is an opaque conductive layer 33 of a material such as a metallic thin film applied by vacuum deposition. This layer, which is used to electrically interconnect photoconductive layer 30 with electroluminescent layer 35 has, as shown in FIG. 3*a*, four separate quadrants 33*a*–33*d* which are insulated from each other. This assures isolation between the separate scanning areas defined by finger patterns 27*a*, 27*b*, 28*a* and 28*b*. Control plate 16, of course, requires a conductive layer 33 segmented into 16 separate sections (not shown) to provide for each of the scanning areas defined by its finger patterns. Deposited on layer 33 is a layer 35 of electroluminescent material, which may comprise gallium arsenide, gallium phosphide or zinc sulfide treated with chemical agents such as copper, chlorine and manganese, this layer being deposited by vacuum deposition. Finally, deposited over electroluminescent layer 35 is a second set of transparent electrodes 28*a* and 28*b*** which may be of tin oxide applied by reactive sputtering.

Multiplier plate 17 comprises a fiber optic substrate **17*a* which has deposited thereon successive layers 17*b* and 17*c* of photoconductive and electroluminescent materials respectively. Multiplier plate 17**, as the name implies, is utilized to increase the intensity of the optical beam.

Modulating grid plate 18 is similar to control plates 15 and 16 except for the replacement of the finger pattern electrodes with electrodes **18*a* and 18*b* which substantially cover entire opposite surface areas of the plate. A modulation signal can be placed between electrodes 18*a* and 18*b*** to provide a signal for intensity modulating the beam.

To facilitate an understanding of the operation of the device of the invention, let us now refer again to FIG. 3. Let us assume for the purposes of illustration that as shown in FIG. 3 a forward biasing potential from a power source 40 is applied through switches 41 and **41*a* between electrodes 28*a* and electrodes 27*a*, while at the same time, a back-biasing potential is applied from power source 45 through switches 46 and 46***a* between electrodes 28*b* and 27*b*, power sources 40 and 45 having equal potentials. Light arriving from planar member 11 passes through fiber optic 21 and electrodes 27*a* and 27*b* strikes photoconductive material 30. The conductivity of photoconductive material varies directly as a function of the light incident thereon. The conductivity of the entire surface of the photoconductive layer 30 will be increased in response to the light arriving from the planar member. Conduction through the photoconductive layer will be responsive to the bias potential applied between oppositely positioned electrode portions.

For the particular example of FIG. 3, a forward bias is provided only for the photoconductive areas encompassed by the right-hand half of electrode 28*a* and the upper half of electrode 27*a*, the remaining portions having nonforward biasing potentials, i.e., either no potential differential thereacross or a back-biasing potential. This results in an electron flow through the upper right-hand portion of the photoconductive layer so as to excite the corresponding portion of electroluminescent layer 35. The electroluminescent layer is predominantly light emitting and conductive only under forward bias; hence, the two zero bias quadrants and the reverse bias quadrant emit no or little light in contrast to the forward bias quadrant. This light emitting area is indicated by stippling in the representation of control plate 15 in FIG. 4. It should be apparent that by appropriately switching the biasing between the electrodes in various manners, any one of the four quadrants of the electroluminescent layer can be excited, light emission occurring only in those regions where there is coincidence of forward bias and decreased conductivity of the photoconductive layer due to optical flux from the optical cathode.

Referring now to FIG. 4, the operation of the device of the invention in providing a scanning beam is schematically illustrated. Electrodes 27*a* and 27*b* are connected to the opposite stages of flip-flop 50; electrodes 28*a* and 28*b* are connected to the opposite stages of flip-flop 51; electrodes 45*a* and 45*b* are connected to the opposite stages of flip-flop 52; and electrodes 46*a* and 46*b* are connected to the opposite stages of flip-flop 53. The electrodes are arranged in a Gray coding in paired sets, the electrodes forming each unit of a pair covering half the total electrode area on the associated control plate surface. Binary switch means in the form of flip-flops 50–53 are connected across power source 65.

With the various flip-flops driven by a digital control (not shown) so as to provide relative potentials in the polarities indicated in FIG. 4, a photon flux beam will effectively be channeled through the control plates as indicated by the stippled area of the front surface of control plate 15, the stippled portion of control plate 16 indicating those portions thereof which are illuminated. Thus, as can be seen, by appropriate control of flip-flops 50–53, a predetermined portion of a display representing a discrete scanning element thereof can be illuminated at a time.

The particular unit of the illustrative example has only a 16 element resolution, i.e., there are 16 discrete separate scanning elements in the display. It can be appreciated, however, that much higher resolution can be obtained by the appropriate addition of further control plates having finer and finer finger pattern electrodes. It also should be readily appreciated that various excitations of flip-flops can cause the beam to scan over the scanning area in either a random or regular pattern. The speed of such scanning, of course, is limited by the photoconductive and electroluminescent material time constants and by the switching capabilities of the control and switching circuitry.

It is to be noted that the biasing voltages can be of a relatively low order, eliminating voltage breakdown problems so common in other types of scanners. Further, the quiescent or DC current required for the device is relatively low. Further, the cascading of the voltage from control plate to control plate between the cathode and the target, as in certain electron-beam-type scanners of the prior art, is not necessary in view of the use of photon coupling between cascaded control plates, rather than electron coupling which requires a progressively higher positive electrical potential. This greatly simplifies the voltage supply problem and voltage insulation difficulties often experienced in electron-beam-type implementations.

The device of this invention thus provides a flying spot scanner of the solid-state electroluminescent type, which is capable of providing relatively high resolution with a minimum number of switching and control elements.

I claim:

1. In a digitally addressed electroluminescent display, a light emitting planar member, and at least one control plate aligned opposite and adjacent to said member for forming a scanning light beam, said control plate comprising a substrate having photoconductive and electroluminescent layers thereon successively, the photoconductive layer being closest to said member, and electrodes located on the opposite outer sides of said two layers, the electrodes on at least one of said sides being arranged in a predetermined coded finger pattern, a modulating plate opposite said planar member for intensity modulating the beam, and means for selectively applying a forward biasing potential between one of said finger pattern electrodes and an electrode on the outer side of the opposite layer to cause electron flow across associated portions of said layers when there is simultaneous light flux incident on the photoconductive layer and simultaneously applying a nonforward biasing potential between the others of said finger pattern electrodes and an electrode on the outer side of the opposite layer to prevent electron flow across associated portions of said layers, whereby a light beam is emitted from portions of said control plate simultaneously being excited with light flux and having a forward bias thereacross.

2. The display of claim 1 wherein there are coded finger pattern electrodes on both outer sides of said layers.

3. The display of claim 1 wherein said substrate comprises a fiber optical coupling medium.

4. The display of claim 1 and additionally including a segmented conductive layer between said photoconductive and electroluminescent layers for electrically interconnecting said layers, said conductive layer being segmented into separate conductive sections corresponding to the scanning areas defined by the finger pattern electrodes.

5. The display of claim 1 wherein there are included a plurality of control plates, each of said plates having electrodes arranged in different finger patterns in accordance with a binary code.

6. The display of claim 1 wherein the fingers of said finger pattern are arranged in a pair, one electrode of each of said pairs having a forward bias potential applied between it and its associated electrode on the outer side of the opposite layer while the other electrode of said pairs is having a nonforward biasing potential applied between it and its associated electrode on the outer side of the opposite layer.

7. The display of claim 6 wherein the electrodes on said outer sides of the opposite layers are arranged in the coded finger pattern.

8. A digitally addressed electroluminescent display comprising a light emitting planar member, and a plurality of control plates aligned opposite said planar member for forming a scanning light beam, each of said control plates comprising a substrate of an optical coupling medium, a layer of photoconductive material deposited over said substrate, said optical coupling medium operating to channel light from the planar member to said photoconductive layer, a layer of electroluminescent material deposited over said photoconductive layer, said plates being oriented with said photoconductive layers towards said planar member and said electroluminescent layers away from said planar member, electrodes arranged in a coded finger pattern on opposite outer sides of said two layers, a modulating plate opposite said planar member for intensity modulating the light beam, and means for selectively applying a forward biasing potential between predetermined ones of the fingers on the opposite outer sides of said layers and simultaneously applying a nonforward biasing potential between the others of the fingers on the opposite outer sides of said layers, whereby when there is simultaneously light flux incident on a portion of the photoconductive layer and a forward biasing potential across said portion, electrons will flow across said photoconductive portion and the portion of said electroluminescent layer opposite thereto will be caused to emit light flux.

9. The display of claim 8 wherein said finger pattern is binary coded.

10. The display of claim 9 wherein said means for selectively applying forward and nonforward biasing potentials comprises binary switch means.

* * * * *